Figure 1:
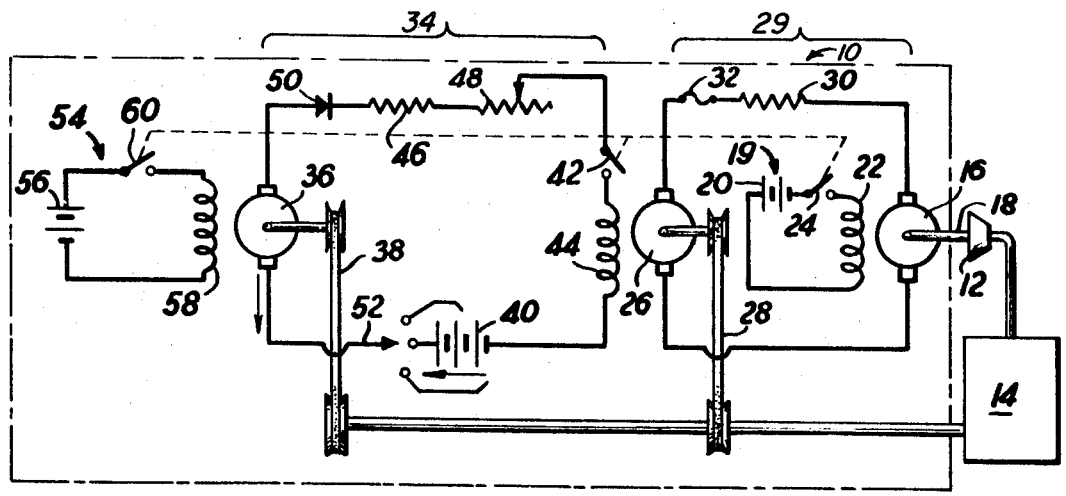

United States Patent

[11] 3,603,853

| | | |
|---|---|---|
| [72] | Inventor | Anthony J. R. Mackay<br>Bremen, Germany |
| [21] | Appl. No. | 846,061 |
| [22] | Filed | July 30, 1969 |
| [45] | Patented | Sept. 7, 1971 |
| [73] | Assignee | Aambeeld, N.V.<br>St. Maarten, Netherlands, Antillen<br>a part interest |

[54] CONTROL SYSTEM FOR DIFFERENTIAL SUPERCHARGER
10 Claims, 2 Drawing Figs.

[52] U.S. Cl. .................................................. 318/146,
                                                        322/88
[51] Int. Cl. .................................................. H02p 5/20
[50] Field of Search .................................. 318/146,
                                         151, 152, 154; 322/88

[56]            References Cited
              UNITED STATES PATENTS
2,791,733   5/1957   Chausse .................   318/146

3,170,104   2/1965   Richards .................   318/146
3,242,407   3/1966   Hansen ...................   318/146
3,350,612  10/1967   Hansen ...................   318/146

*Primary Examiner*—Oris L. Rader
*Assistant Examiner*—Thomas Langer
*Attorney*—Davis, Hoxie, Faithfull & Hapgood

ABSTRACT: An electrical control system for a differential supercharger is disclosed which includes a power generator for providing armature current to the supercharger motor, and a control circuit for providing the field flux to the power generator, the control circuit having a constant direct current source and a direct current control generator in opposition to the constant source. The control generator and power generator are driven by the engine with which the supercharger works. After a minimum engine speed is reached as the engine speed increases the power generator output current to the motor armature decreases resulting in a decrease in supercharging of the engine.

INVENTOR.
ANTHONY J.P. MACKAY
BY
Davis, Hoxie, Faithfull & Hapgood
ATTORNEYS

CONTROL SYSTEM FOR DIFFERENTIAL SUPERCHARGER

This invention relates to engine-driven superchargers and, more particularly, to a control system for a supercharger which produces maximum charging at low engine speeds with the amount of supercharging decreasing at a rate which varies inversely with the speed of the engine.

Most conventional engine-driven superchargers produce an amount of supercharging which is proportional to the speed of the engine. In other words, when the engine is operating at low speeds the amount of supercharging is minimum and as the engine speed increases, the amount of supercharging increases. This is usually accomplished by either a direct mechanical or electrical drive connection between the engine and the supercharger or supercharger controls. There are instances, however, where it is desirable to have the beneficial effects of supercharging at low speeds rather than high speeds. For example, conventional internal combustion engines have a relatively low torque curve when the engine is operating at low speeds making it difficult for an internal combustion engine to efficiently perform heavy duties such as transport heavy loads at low engine speeds. To enable vehicles with internal combustion engines to transport heavy loads, a gearing arrangement is utilized which allows the engine to operate always at high speeds when maximum power is required even though the vehicle is traveling slowly. A differential supercharger provides maximum supercharging at low engine speeds and has a diminishing charging effect as the engine speed increases. The effect of differential supercharging is to raise the torque curve for low engine speeds thereby providing internal combustion engines with greater inherent effectiveness at low engine speeds rather than obtaining the effective power through steering.

Present day differential superchargers, which obtain their driving power from the engine being supercharged, utilize mechanical connections to obtain the differential effect. Such connections as belt drives and planetary differential gearing are known. These systems, once constructed and assembled, have a limited degree of flexibility of use as compared with electrical controls which may be operated over a wider range and with smaller discrete increments or, in fact, which may be varied continuously. The control system of this invention provides differential supercharging with a desired degree of control flexibility.

Briefly stated, this invention, in one form, comprises a means for energizing a supercharger such that the energy input to the supercharger varies inversely with the speed of the engine. To accomplish this, a power generator provides current to the armature of a motor which drives the supercharger, the power generator being driven directly by the engine. To provide the field for the power generator, a field excitation battery and a control generator driven by the engine are included in a power generator field excitation circuit such that the outputs of the battery and generator are in opposition to each other with the sum representing the excitation voltage for the power generator. When the speed of the engine is low the battery voltage greatly exceeds the voltage of the control generator. Since the battery voltage is constant and the control generator voltage increases proportionally as the engine speed increases, due to the direct drive connection, the sum of the battery output and control generator output decreases proportionally as the engine speed increases. The output of the power generator is proportional to its speed of rotation and the value of the field excitation voltage, which are varying in opposite directions. Therefore, the curve representing power generator output versus engine speed increases at very low engine speeds, reaches a peak and then decreases toward the zero energy level. The desired inverse proportionality is achieved on the second half of the curve, that is, the decreasing portion of the curve. The slope of the curve and the location of the curve on the "engine speed" coordinate may be changed by varying the voltage and current in the power generator field excitation circuit.

Figure 2:
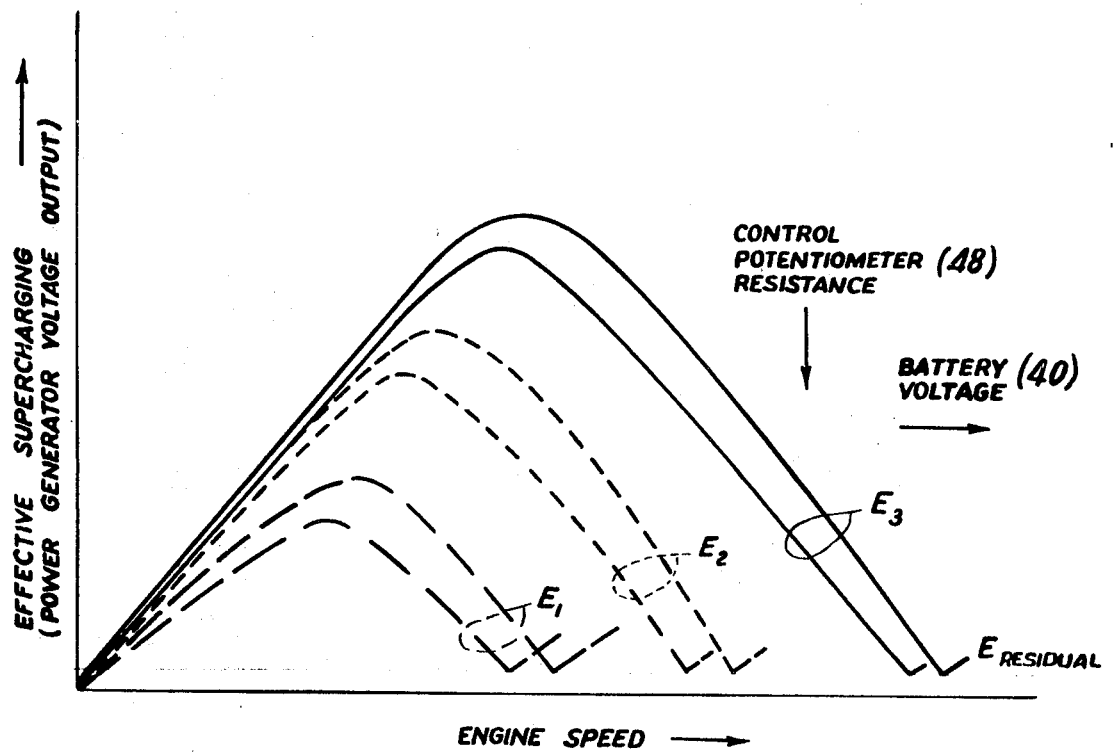

This invention will be understood better by reference to the detailed description below, together with the drawing in which, FIG. 1 illustrates a schematic representation of a control system for a differential supercharger formed in accordance with this invention, and FIG. 2 illustrates the pattern of degree of supercharging and power generator output as a function of engine speed.

Referring now to the drawing, there is schematically illustrated in FIG. 1 a control system 10 for controlling the energization of a compressor or supercharger 12 which is in airflow communication with an internal combustion engine 14. The control system includes an electric motor 16 for driving the compressor 12 through any conventional connecting means, such as a shaft 18. The field for the motor 16 is provided by a field excitation circuit 19 which includes a battery 20 and a field coil 22 and which is controlled by a switch 24. The electric current for the motor armature is provided by a primary or power generator 26, which is driven by the engine 14 in any conventional way, such as through a belt drive 28. The power generator 26 is connected in a motor armature circuit 29 which also includes an armature resistance 30 and an overload fuse 32.

A power generator field excitation circuit 34 establishes the field for the power generator 26. The field excitation circuit 34 includes a direct current control generator 36 which is driven directly by the engine 14 by any suitable means, such as a belt drive 38. The circuit 34 also includes a second direct current source, such as a battery 40 placed in series alignment with the control generator 36 but whose current direction is in opposition to the direction of the current generated by the control generator 36 or, in other words, the generator 36 and battery 40 work in opposition to each other. The power generator field excitation circuit 34 further includes a switch 42 (which is ganged with the switch 24 of the motor field excitation circuit 19), a field coil 44, an armature resistance 46 and a control potentiometer 48. A gate, such as a diode 50 is provided to permit current to flow through the field excitation circuit 34 in only a single direction, that direction being the direction of battery current flow. A multipole switch 52 enables variation of the amplitude of the second direct current source 40. The control potentiometer 48 and multipole switch provide the ability to vary the time at which the supercharger becomes differential, as is discussed below. The filed for the control generator 36 is supplied by a field excitation circuit, 54 which includes a field excitation battery 56, a field coil 58 and a switch 60 which is ganged together with the switches 42 and 24 of the other field excitation circuits 34, 19.

Closing the field excitation circuit switches 24, 42 and 60 immediately sets up a field for the control and power generators 36, 26 and the motor 16. The speed of the compressor 12 is related directly to the speed of the motor 16 which is a function of the current supplied to the motor armature by the power generator 26. Therefore, the speed of the motor 16 is a function of the magnitude of the power generator's field or, in other words, the voltage drop across the field coil 44, and the speed of the power generator 26, which is controlled directly by the engine 14. The magnitude of the field for the power generator 26 is a function of the voltage of battery 40 and the output of the control generator 36 which, in turn, depends upon the speed of the engine 14 since the field for the control generator is constant. Tracing these functions and dependencies through it will be seen that on startup or while the engine 14 is operating at a low speed, the power generated by the control generator 36 is small and will be greatly exceeded by the output of the battery 40. It should be noted that a low-voltage battery 56 is used in the control generator field excitation circuit 54 so that the output of the control generator 36 at low speed is small. Since the unidirectional gate of diode 50 permits current flow in the direction determined by the battery 40, the field coil 44 has a voltage across it representative of the battery 40, reduced by the power losses in the resistors 46 and 48, since the countereffect of the control generator 36 at low speeds is small.

As the speed of the engine 14 increases, the output of the control generator 36 increases due to its increased speed and, at the same time, the output of the power generator 26 increases due to its increased speed. Assuming that the control generator 36 and power generator 26 are identical, since the field flux provided by the field coil 44 for the power generator 26 is larger than the field flux provided by the field coil 58 for the control generator 36 because the voltage of the battery 40 is much greater than that of battery 56, and since both generators are rotating at the same speed, the output of the power generator 26 increases as the speed of the engine 14 increases. Consequently, the power supplied to the armature of the motor 16 also increases in direct relation to the increased speed of the engine 14. Since the motor field excitation is constant, the motor speed is monitored entirely by the motor armature current and, therefore, the speed of the supercharger 12 is monitored directly by the motor armature current. This is represented on the left-hand portion of the curve illustrated in FIG. 2.

As the speed of the control generator 36 increases, its output effectively reduces the voltage across the field coil 44 at an increasing rate and the rate of increase of the output of the power generator 26 is reduced due to the reduction in field magnitude. This is reflected near the peak of the curve of FIG. 2 where the maximum voltage generated is being approached. As the output of the control generator 36 approaches the output of the battery 40 the magnitude of the field for the power generator 26 becomes equal to the field for the control generator 36 at which time the power generated by the power and control generators 26, 36 is approximately equal. Any additional increase in speed of the engine 14 results in an increased output by the control generator 36 reducing the magnitude of the field for the power generator 26 to a point where the output of the power generator 26 beings to decline and, consequently, the motor armature current declines. This can be seen on the right-hand side of the curve of FIG. 2. From that point on, an increase in speed of the engine 14 results in a decrease in speed of the motor 16 and, hence, supercharger 12. The second half of the curve, or the decreasing slope portion of the curve, represents the "differential" characteristic of the control circuit 10. It becomes clear that with an increase in engine speed eventually the output of the control generator 36 will equal and then exceed the output of the battery 40. At that instant the diode 50 becomes effective and prevents the flow of current through the primary generator field excitation circuit 34 from reversing direction since the diode will only permit current to flow in the direction caused by a flow from the battery 40. At these higher speeds, where the output of the control generator 36 equals or exceeds that of the battery 40, theoretically there will be no field flux for the power generator 26; however, the power generator 26 has residual magnetism which provides a minimum field flux.

The discussion above is predicated upon the assumption that the control generator 36 and power generator 26 are identical and their driving connections with the engine 14 are identical. Any variation from this assumption merely shifts the peak of thy curve along the "engine-speed" coordinate. For example, if the drive for the power generator 26 is geared down with respect to the drive for control generator 36, the curve will peak at a lower engine speed.

The curve of FIG. 2 also illustrates the effective control provided the control system 10 by the multipole switch 52 and the potentiometer 48. The figure illustrates three sets of curves denominated $E_1$, $E_2$, and $E_3$ representing three different positions of the multipole switch 52, with $E_3$ representing a higher voltage level than $E_2$ which in turn is higher than $E_1$. It will be seen that an increase in battery voltage raises the peak valve of the power generator output and shifts the curves toward the right thus delaying the start of the differential characteristics until the engine 14 is operating at higher speeds. This can be explained by the fact that a higher battery voltage requires a faster rotating control generator in order to overcome the effect of the battery. The maximum value of the output of the power generator 26 and the engine speed at which the curve peaks also is controlled by the potentiometer 48. Looking at any one set of curves, for example, set $E_3$ it can be seen that as the resistance value of the potentiometer 48 increases, the output of the power generator 26 decreases. Furthermore, as the resistance of the potentiometer increases the peak value of the power generator output is reached at lower values of engine speed thus shifting the curves for a given battery voltage toward the left thus bringing into effect the differential characteristic at lower engine speeds. The shift toward the left is accomplished for the same reasons that a decrease in voltage of the battery 40 results in a shift toward the left of the curves as explained above. It should be remembered that the voltage across the field coil 44 is equal to the voltage of the battery 40 minus the voltage generated by the control generator 36 and the voltage drop across the resistor 46 and potentiometer 48. Since the voltage drop across the potentiometer 48 is equal to the current through the potentiometer times its resistance value, as the resistance of the potentiometer is increased the voltage drop is increased thus reducing the voltage across the field coil 44. A reduction in voltage across the field coil 44 results in a reduced field flux which enables the control generator 36 to produce the differential characteristic at lower engine speeds.

As is discussed above, the output of the control generator increases as the speed of the engine increases until it equals and eventually exceeds the voltage provided by the battery 40. Because of the diode 50 a reversed current flow will not occur. There will be no field flux provided for the power generator 26 by the field excitation circuit 34. Instead of the output of the power generator 26 dropping to zero because of the lack of a field flux, the output reaches a minimum level below which it will not drop because of the residual magnetism left in the power generator so that as long as the generator is rotating a voltage will be generated. Furthermore, since the residual magnetism is a relatively constant value, as the speed of the engine increases the output of the power generator 26 being to increase again. Only the inception of this increase is shown on FIG. 2 since the increase takes place beyond the normal operating range of the engine and, therefore, is of no practical concern.

As can be seen from the above, the control system of this invention provides differential characteristics for controlling a supercharger with the ability of being able to control the differential characteristics very simply by the movement of a switch or control knob to vary the battery voltage and the resistance in the control circuit. This provides a system with considerable flexibility of operation to enable use of the differential characteristics at low engine speeds or higher engine speeds, as desired.

What is claimed as new and desired to be secured by Letters Patent of the United States is:

1. A control system adapted for use with a compressor and engine in order to energize the compressor in inverse proportion to the speed of the engine, the system including:

an electric motor adapted to drive the compressor, a motor circuit for providing field flux for the motor, a primary generator for providing current to the motor armature, a primary generator field excitation circuit including a field coil, a direct current generator and a second direct current source working in opposition to the direct current generator with the resultant voltage being applied across the field coil, the voltage of the second direct current source being greater than the direct current generator for at least a major portion of the operating range of the control system, means for providing a field flux for the direct current generator, the primary and direct current generators being adapted to be driven by the engine whereby the current provided to the motor armature varies inversely with the speed of the engine.

2. A control system as defined in claim 1 wherein the primary generator field excitation circuit includes gate means permitting current to flow only in the direction of flow produced by the second direct current source.

3. A control system as defined in claim 1 including means for varying the impedance of the primary generator field excitation circuit.

4. A control system as defined in claim 1 wherein the primary generator field excitation circuit includes a variable resistance for controlling the field excitation current.

5. A control system as defined in claim 1 wherein the primary generator field excitation circuit includes means for varying the voltage provided by the second direct current source.

6. A control system as defined in claim 4 wherein the primary generator field excitation circuit includes means for varying the voltage provided by the second direct current source.

7. An engine-supercharging control system comprising an engine,
a compressor in airflow communication with the engine,
an electric motor drivingly connected to the compressor,
a motor circuit providing a field flux for the motor,
a primary generator providing current to the armature of the motor,
a primary generator field excitation circuit including a field coil, a direct current generator, a battery working in opposition to the direct current generator, with the resultant voltage being applied across the field coil, the battery voltage being not less than the output voltage of the direct current generator during the major portion of the operating range of the system,
gate means for permitting current to flow in the primary generator field excitation circuit only in the direction of flow provided by the battery,
means providing a field flux for the direct current generator,
means connecting the engine to the primary and direct current generators whereby the current provided to the motor armature varies inversely with the engine speed.

8. A system as defined in claim 7 wherein the motor circuit and means for providing a field flux for the direct current generator provide constant field flux.

9. A system as defined in claim 7 including control means for varying the current flow through the field coil.

10. A system as defined in claim 7 including means for varying the impedance of the primary generator field excitation circuit.